United States Patent [19]

Friedwald

[11] Patent Number: 4,707,894
[45] Date of Patent: Nov. 24, 1987

[54] FASTENING SYSTEM FOR INTERCONNECTING SHEETS OF PLASTIC MATERIALS INCLUDING GLASS

[75] Inventor: David Friedwald, Cherry Hill, N.J.

[73] Assignee: Polycast Technology Corporation, Stamford, Conn.

[21] Appl. No.: 3,137

[22] Filed: Jan. 14, 1987

[51] Int. Cl.$^4$ .............................................. A44B 21/00
[52] U.S. Cl. ...................................... 24/459; 24/297; 24/456; 52/471
[58] Field of Search .......................... 24/459, 456, 297; 52/471, 772; 411/508

[56] References Cited

U.S. PATENT DOCUMENTS

| | | | |
|---|---|---|---|
| 3,688,460 | 9/1972 | Van Loghem et al. | 52/471 |
| 3,856,246 | 12/1974 | Sinko | 24/459 |
| 4,222,210 | 9/1980 | Hanstein et al. | 52/772 |
| 4,426,760 | 1/1984 | Watts | 24/456 |
| 4,568,215 | 2/1986 | Nelson | 24/297 |
| 4,648,231 | 3/1987 | Laroche | 24/459 |

FOREIGN PATENT DOCUMENTS

| | | | |
|---|---|---|---|
| 221618 | 6/1962 | Austria | 24/459 |
| 963624 | 3/1975 | Canada | 52/471 |

*Primary Examiner*—Victor N. Sakran
*Attorney, Agent, or Firm*—Parmelee, Bollinger & Bramblett

[57] ABSTRACT

Sheets of plastic materials including glass are interconnected along a longitudinal outer dimension thereof by an elongated longitudinal female interconnecting member having an upstanding base with transverse legs extending on opposite sides thereof and a central longitudinal socket therein having an open top with a downwardly extending prong receptacle which extends longitudinally the entire length of the socket. The female interconnecting member is adapted to mate with a male interconnecting member having an upstanding longitudinal housing with transverse support members extending from opposite sides thereof and having a downwardly extending bayonet prong centrally located in and integral with the housing extending longitudinally the length of the housing. The sheets to be interconnected are fastened between the male and female interconnecting members with the bayonet prong of the male member inserted in the prong receptacle of the female member thereby bringing the transverse legs of the female member and the transverse support members of the male member into contact with the lower and upper surfaces respectively, of the sheets being interconnected which are in effect clamped therebetween. The transverse support members of the male interconnecting member as well as the transverse legs of the base of the female member have fingers protruding therefrom thereby sealing the interconnecting members to the sheets being interconnected. A variable socket arrangement is provided in the female interconnecting member to accommodate different depths of insertion of the bayonet prong of the male interconnecting member into the socket permitting the interconnection of different thickness sheets based on the depth of insertion of the male member into the female member. The construction of the probe as well as the socket provide an interlocking relationship which may be released permitting the interconnection and disconnection of large sheets of material along the entire length of a longitudinal end thereof.

4 Claims, 4 Drawing Figures

FASTENING SYSTEM FOR INTERCONNECTING SHEETS OF PLASTIC MATERIALS INCLUDING GLASS

BACKGROUND OF THE INVENTION

This invention relates to fastening systems, and more particularly to such systems for interconnecting large sheets of plastic material including glass along the entire end thereof utilizing extruded plastic male and female fasteners.

The interconnection of large sheets of plastics materials including glass are difficult to intercouple and normally require permanent, expensive frame-type structures which may require special design, are expensive, and make installation and removal of the large sheets difficult. This is particularly true with respect to double walled plastic sheets because even on their interconnection using frames and other means the interior of the double walled structure is vulnerable unless somehow sealed in a manner to prevent exposure of the interior to the environment. Although these structures can be taped, fused or interconnected in other ways, the interconnection is either permanent or not satisfactory and in many instances incapable of being disconnected without damaging the interconnected sheets and preventing the reuse of the means used for interconnecting the sheets in the first instance. Of course, interconnecting large cast sheets of plastics or glass along an entire longitudinal edge thereof in a quick, inexpensive manner and likewise separating the structures without damaging the sheets or their interconnecting system would be highly advantageous.

SUMMARY

Accordingly, it is an object of this invention to provide a new and improved fastening system for interconnecting sheets of materials such as plastics and glass along an entire longitudinal dimension thereof which is efficient, economical and relatively easy to assemble and disassemble.

A further object of this invention is to provide a new and improved fastening system for interconnecting rigid and semi-rigid sheets of material such as plastics and glass which effectively seals the sheets of material being interconnected in the fastening system to prevent the edges and/or interiors of the sheets from exposure to deterioration from the environment.

Still another object of this invention is to provide a new and improved fastening system for interconnecting sheets of material such as plastic and glass which will accommodate the interconnection of various thicknesses of the materials being interconnected.

Still a further object of this invention is to provide a new and improved fastening system for interconnecting sheets of material which interconnection system can be used to disconnect the assembled sheets and then may be reused.

In carrying out this invention in one illustrative embodiment thereof, a fastening system is provided for interconnecting sheets of materials such as plastics and glass having an elongated longitudinal female interconnecting member with an upstanding longitudinal base having transverse legs extending from opposite sides thereof and a central longitudinal socket in the base having an open top with a downwardly extending prong receptacle therein which extends longitudinally the entire length of the socket. A male interconnecting member is provided having an upstanding longitudinal housing with transverse support members extending from opposite sides of that housing and a downwardly extending bayonet prong centrally located in and integral with the housing which extends longitudinally the length of the housing. The female and male interconnecting members are adapted to have the sheets of material to be interconnected positioned therebetween such that when the downwardly extending bayonet prong of the male member is inserted in the prong receptacle of the female member the support members of the male interconnecting member are brought into contact with the upper longitudinal dimension of the material sheets being interconnected while the legs of the female interconnecting member are brought into abutting contact with the lower longitudinal dimension of the sheets being interconnected thereby clamping the sheets being interconnected between the male and female interconnecting members.

The prong receptacle of the female interconnecting member has a depth which can be varied in accordance with the depths of the insertion of the bayonet prong of the male member thereby accommodating different thicknesses of sheets which may be interconnected by the fastening system. The transverse support members and legs of the male and female interconnecting members respectively, have fingers extending therefrom which when the interconnected sheets are clamped in the fastening means effectively seal the sheets in the fastening means to prevent exposure to the environment of the interconnected ends.

BRIEF DESCRIPTION OF THE DRAWINGS

The invention, together with further aspects, objects, features and advantages thereof may be more clearly understood from the following description taken in connection with the accompanying drawings.

DESCRIPTION OF THE PREFERRED EMBODIMENTS

Figure 1:
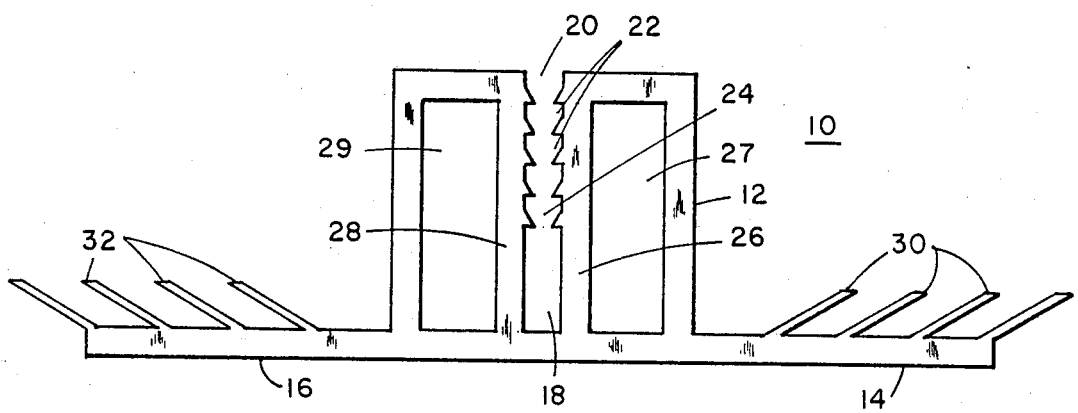
FIG. 1 is an end elevational view of the female interconnecting member for the fastening system of the present invention.

Referring now to FIG. 1, the fastening system in accordance with the present invention includes a female interconnecting member, referred to generally with the reference numeral 10, having a base 12 with transverse legs 14 and 16 extending outwardly from opposite sides thereof. The base 12 contains a central socket 18 with an open top 20 and a series of top shaped openings 22 therein forming a prong receiving receptacle which extends downwardly from the open top of the socket 18 and extends longitudinally the entire length of the base 12. The socket 18 is formed by side walls 26 and 28 which are part of the base 12. The base 12 includes longitudinal openings 27 and 29 extending the length thereof which not only save on material but allow flexibility for the insertion of the male member into the prong receptacle 24 of the socket 18 in the base 12. The transverse leg members 14 and 16 have a plurality of angled upstanding fingers 30 and 32 thereon which form an integral part of the female interconnecting member 10. The entire interconnecting female member 10 may be an extrusion and the fingers 30 and 32 may be extruded thereon of a different more flexible type plastic in a known manner. The less rigid, more flexible integral fingers 30 and 32 will be used as sealing members for sheets of material interconnected by the system of the present invention as will be explained hereinafter.

Figure 2:
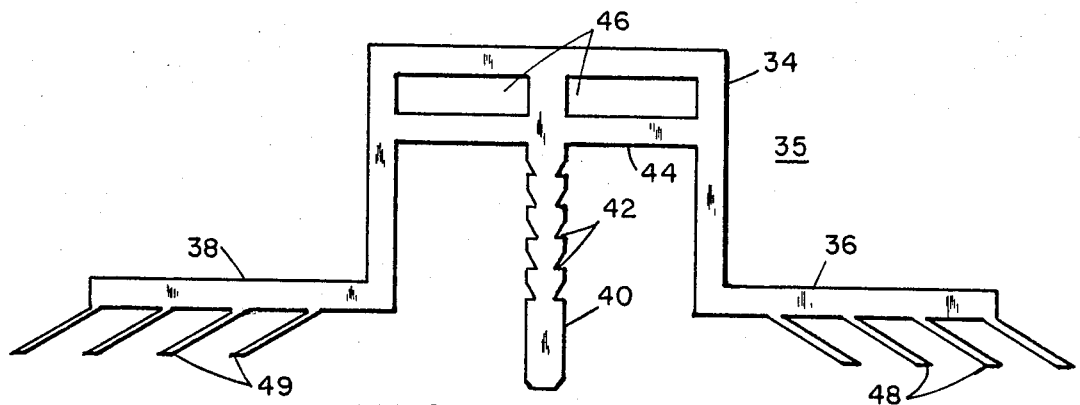
FIG. 2 is an inside elevational view of the male interconnecting member which is complementary to and adapted to be inserted into the female member illustrated in FIG. 1 in accordance with the present invention.

In FIG. 2 a male interconnecting member, referred to generally with the reference numeral 35, has an upstanding longitudinal housing 34 thereon with transverse support members 36 and 38 extending outwardly from opposite sides of the housing 34. Extending downwardly, centrally from the housing 34 is a bayonet prong 40 having a series of barbed probes 42 thereon which have a similar and complementary configuration which are adapted to fit in and mesh with the top shaped openings 22 of the prong receptacle 24 of the female interconnecting member 10. The bayonet prong 40 is centrally attached and integral with a ceiling member 44 of the housing 34. The ceiling 44 of the housing 34 includes longitudinal openings 46 which save on material and permit greater flexibility for the insertion and removal of the bayonet prong 40 of the male interconnecting member 35 with respect to the female interconnecting member 10. Extending downwardly from the housing support members 36 and 38 are angled fingers 48 and 49, respectively, which are integral with the transverse support members and like their counterparts 30 and 32 on the female interconnecting member 10 are extrusions of softer, more flexible plastic material preferably the same as that of members 30 and 32 to perform in combination therewith a sealing function once the fastening system has been applied to a sheet of material.

Figure 3:
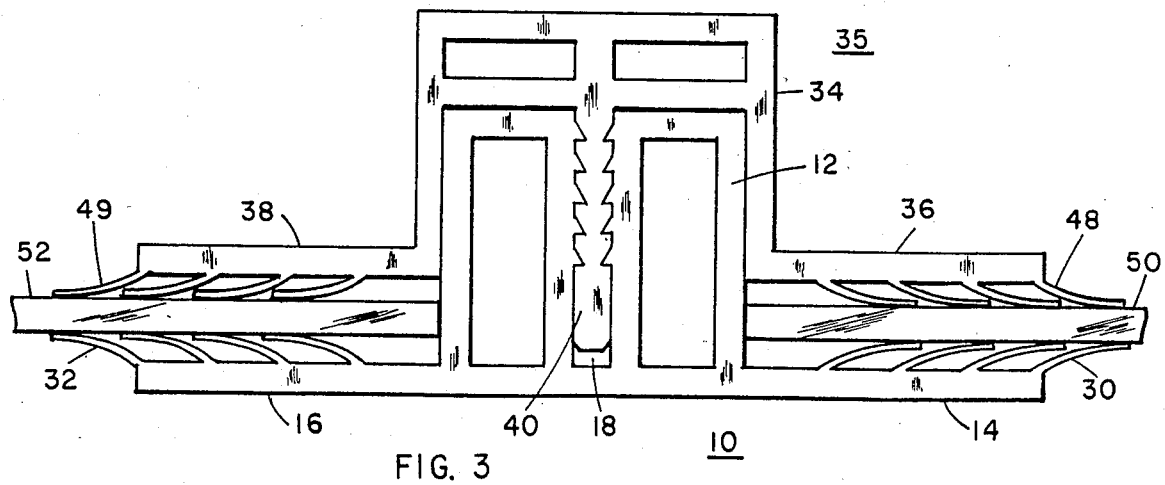
FIG. 3 is an end elevational view illustrating the interconnection of two sheets of material utilizing the fastening system namely, the female interconnecting member of FIG. 1 and the male interconnecting member of FIG. 2 interconnected as shown in FIG. 3.
Figure 4:
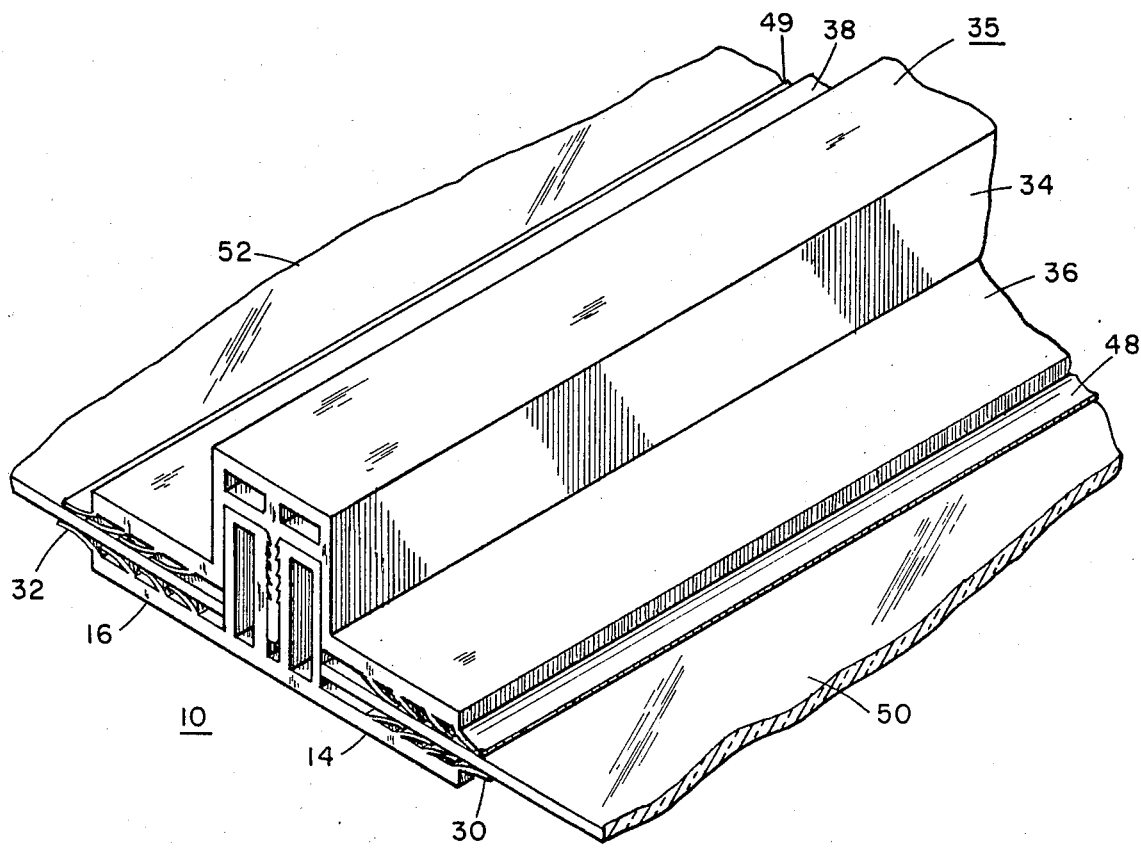
FIG. 4 is a perspective view of FIG. 3 illustrating the assembly of the fastening system with a pair of interconnected sheets in accordance with the present invention.

In FIGS. 3 and 4 the fastening system in accordance with the present invention is shown assembled interconnecting sheets of material such as rigid or semi-rigid plastic or glass 50 and 52. First the sheets 50 and 52 are positioned on the transverse legs 14 and 16 abutting the upstanding longitudinal base 12 of the female interconnecting member 10. The sheet 50 rests on the angled sealing fingers 30 while the sheet 52 rests on the angled sealing fingers 32. The male interconnecting member 35 is then placed on top of the sheets 50 and 52 and the bayonet prong 40 is inserted into the socket 18 with the barbed configurations 42 thereon meshing with and engaging the top shaped openings 32 of the prong receptacle 24 of the socket 18. This insertion of the male member 10 into the female member 35 securely fastens the interconnecting members 10 and 35 together thereby clamping the large sheets of material 50 and 52 therebetween thereby effectively interconnecting the same. The flexible fingers 30 and 32 bearing upwardly on the undersurface of interconnected sheets 50 and 52 respectively, are also sealed from the top by the fingers 48 and 49 bearing on the upper surface of the sheets 50 and 52 respectively, therefor sealing the interconnection from both sides thereby preventing moisture or other contaminants from reaching the end surfaces of the interconnected sheets of material 50 and 52. This may be particularly important if the sheets of material being interconnected are double walled thereby providing openings or air space between the double wall structure. In such a case it would be essential to isolate the interior of the double wall surface from the environment so as not to contaminate or otherwise damage the interior portion of the sheets.

The fastening system is particularly suited for large sheets of material such as semi-rigid or rigid plastics and glass. The structures may be also double walled plastics. It will be apparent that with the present system in which both the male and female members 35 and 10 may be unitary extruded pieces which may be made in longitudinal lengths which may be varied in accordance with the lengths of the sheets which may be interconnected for example, four or eight feet or various long lengths. The interconnecting members 10 and 35 may be made of rigid PVC, for example, while the flexible fingers 30, 32 , 48 and 49 may be made of flexible PVC using the same die.

Using this type of arrangement as has been pointed out, the interconnection is sealed by two parts which surround the top and bottom with soft flexible plastic fingers.

It should be noted that the prong receptacle 24 of the socket 18 has a variable depth which may be varied in accordance with the depth of insertion of the bayonet prong 40 into the socket. Accordingly, by inserting the prong 40 all the way in the receptacle 18 thinner sheets of material may be intercoupled. The less the prong 40 is inserted will accommodate the interconnection of larger sheets. Accordingly, the variable socket arrangement can handle various thicknesses of sheets of material based on the depth of insertion or penetration of the bayonet prong 40 into the socket 18.

The insertion of the prong 40 with the barbed configurations 42 into the socket 40 with its complementary top shaped openings 42 therein, provide a locked configuration when the prong 40 is inserted into the barbed receptacle 24. However, once assembled and the sheets 50 and 52 are clamped in the fastening means composed of the female interconnecting member 10 and the male interconnecting member 35 may be released by pushing down on the top of housing 34 of the male interconnecting member 35 and sliding the member 35 out in a transverse direction to the longitudinal interconnection direction of the sheets. Thus, the system may be easily assembled and disassembled without damaging the sheets which have been interconnected or the fastening assembly.

Accordingly, an inexpensive way of interconnecting large length sheets of materials particularly semi-rigid and rigid plastics or glass is provided in which the interconnecting system extends along the entire length of a longitudinal dimension of a large sheet of material. In addition, the fastening system itself is an inexpensive extrusion accommodating two different types of plastic which provide a rigid interconnection as well as a flexible sealing means which permit easy installation and assembly and sealing of the sheets within the fastening structure as well as permitting the removal of the fastening structure without damaging either it or the sheets which have been assembled.

Since other changes and modifications varied to fit particular operating requirements and environments will be apparent to those skilled in the art, the invention is not considered limited to the examples chosen for purposes of illustration, and includes all changes and modifications which do not constitute departure from the true spirit and scope of this invention as claimed in the following claims and equivalents thereto.

What is claimed is:

1. A fastening system for interconnecting sheets of material such as plastics and glass comprising:

an elongated longitudinal female member having an upstanding longitudinal rectangular base with transverse legs extending from opposite sides thereof, a central longitudinal socket in said base having an open top with a downwardly extending prong receptacle therein formed by upstanding side walls extending longitudinally the entire length of said base and having enclosed longitudinal openings the length of said base on both sides of said socket, a male interconnecting member having an upstanding rectangular longitudinal housing with transverse support members extending from opposite sides of said housing, a downwardly extending bayonet prong centrally located in and integral with said housing extending longitudinally the length of said housing, said female member adapted to have material sheets to be interconnected positioned along a lower longitudinal dimension on said legs abutting opposite sides of said upstanding rectangular base, said male member adapted to have said downwardly extending bayonet prong inserted in said prong receptacle in said female member thereby rectangularly closing said socket in said female member and bringing the support members of said male member into contact with an upper longitudinal dimension of said material sheets being interconnected whereby said material sheets are clamped between said male and female interconnecting members thereby interconnecting the sheets of material.

2. The fastening system as claimed in claim 1 wherein said prong receptacle has a variable prong receptacle means for receiving said bayonet prong in different depth positions in said prong receptacle in order to accommodate different width sheets for interconnection by said fastening system.

3. A fastening system for interconnecting sheets of material such as plastics and glass comprising:

an elongated longitudinal female member having an upstanding longitudinal base with transverse legs extending from opposite sides thereof, a central longitudinal socket in said base having an open top with a downwardly extending prong receptacle therein extending longitudinally the entire length of said base, a male interconnecting member having an upstanding longitudinal housing with transverse support members extending from opposite sides of said housing, a downwardly extending bayonet prong centrally located in and integral with said housing extending longitudinally the length of said housing, said female member adapted to have material sheets to be interconnected positioned along a lower longitudinal dimension on said legs abutting opposite sides of said upstanding base, said male member adapted to have said downwardly extending bayonet prong inserted in said prong receptacle in said female member thereby bringing the support members of said male member into contact with an upper longitudinal dimension of said material sheets being interconnected whereby said material sheets are clamped between said male and female interconnecting members thereby interconnecting the sheets of material, said prong receptacle has a variable prong receptacle means for receiving said bayonet prong in different depth positions in said prong receptacle in order to accommodate different width sheets for interconnection by said fastening system, said variable prong receptacle comprises a series of vertically aligned and interconnecting top shaped openings which are adapted to receive and retain therein said bayonet prong, said bayonet prong having interconnected and vertically aligned barbed configurations which are complementary with said top shaped openings in said prong receptacle, said transverse support members on said male interconnecting member have angled downwardly extending flexible fingers extending therefrom and said legs of said female interconnecting member have angled upwardly extending flexible fingers extending therefor, said upwardly and downwardly extending fingers adapted to seal said sheets of material being interconnected by said male and female interconnecting member when said sheets are clamped therebetween, 4. A fastening system for interconnecting sheets of material such as plastics and glass comprising:

an elongated longitudinal female member having an upstanding longitudinal base with transverse legs extending from opposite sides thereof, a central longitudinal socket in said base having an open top with a downwardly extending prong receptacle therein extending longitudinally the entire length of said base, a male interconnecting member having an upstanding longitudinal housing with transverse support members extending from opposite sides of said housing, a downwardly extending bayonet prong centrally located in and integral with said housing extending longitudinally the length of said housing, said female member adapted to have material sheets to be interconnected positioned along a lower longitudinal dimension on said legs abutting opposite sides of said upstanding base, said male member adapted to have said downwardly extending bayonet prong inserted in said prong receptacle in said female member thereby bringing the support members of said male member into contact with an upper longitudinal dimension of said material sheets being interconnected whereby said material sheets are clamped between said male and female interconnecting members thereby interconnecting the sheets of material, said transverse support members on said male interconnecting member has angled downwardly extending flexible fingers extending therefrom and said legs of said female interconnecting member has angled upwardly extending flexible fingers extending therefor, said upwardly and downwardly extending fingers adapted to seal said sheets of material being interconnected by said male and female interconnecting members when said sheets are clamped therebetween.

* * * * *